Fig.1.

Oct. 19, 1965     B. L. SILVERBLATT     3,212,979
CORE SUPPORT STRUCTURE
Filed April 18, 1961     6 Sheets-Sheet 2

United States Patent Office 3,212,979
Patented Oct. 19, 1965

3,212,979
CORE SUPPORT STRUCTURE
Bernard L. Silverblatt, Pittsburgh, Pa., assignor to Westinghouse Electric Corporation, East Pittsburgh, Pa., a corporation of Pennsylvania
Filed Apr. 18, 1961, Ser. No. 103,930
10 Claims. (Cl. 176—36)

The present invention is directed to neutronic reactors and, more particularly, to reactors of the type having discrete fuel elements supported within a vessel. More specifically, the invention is directed to neutronic reactors of the heterogeneous type and to the supporting structure for the fuel elements thereof.

Heterogeneous neutronic reactors are provided with a core region wherein a fissile isotope such as U-235, U-233 and Pu-239 is disposed by providing a plurality of discrete fuel elements containing such isotope. Moderator material, such as water, is disposed adjacent the fuel elements to permit the "thermalizing" of neutrons emitted from the fissile material. In addition, the moderating material passes adjacent each of the fuel elements to conduct heat therefrom. The moderating material is thus caused to act as both a moderator and a coolant. Neutronic reactors are controlled by providing neutron absorber material, such as silver-indium-cadmium which can be formed desirably as elongated, control elements or rods which are inserted and withdrawn from the core region.

As is known, it is necessary to provide a supporting structure within the reactor vessel to support the fuel elements and maintain the spacing thereof. The fuel elements are desirably fabricated into assemblies or fuel clusters with each cluster having an upper and a lower extension formed to position the clusters and to permit the coolant to flow therethrough. In order to support the fuel clusters, upper and lower core supporting plates are provided to engage respectively the upper and lower cluster extensions. The core plates are required to be formed so as to position accurately the fuel clusters and support the weight thereof. In accordance with the prior art, such core plates have been formed of a relatively thick welded sandwich or solid type member or from closely spaced parallel sheets of metal providing a hollow area and including strengthening means disposed between the sheets.

In the hollow or sandwich type core plates there are substantial disadvantages. Since a substantial amount of heat is produced and since a great number of subatomic particles and other radiations, such as gamma rays, are located in a relatively small region, the supporting structure for the core is in close range of these radiations and is subjected to considerable thermal stresses. Also, since the sandwich type construction is the primary structural supporting member, particularly in the lower core plate of previous reactors, coolant flow holes must be restricted to increase the rigidity thereof which, in turn, results in fluid pressure losses. Further, this type of construction requires a relatively long time to fabricate due to a large amount of welding and machining, and is very expensive because of such welding and machining and the possibility of a high scrap rate. The closely located but spaced parallel sheet type support plate also has similar disadvantages because it too is primarily a supporting structure and must be located close to the core and be thus subjected to intense heating and neutron bombardment. A thick solid core plate is even more greatly subjected to extreme gamma heating stresses since this thermal stress varies exponentially as the thickness. Furthermore, as reactor cores become larger to gain more power output, the above-mentioned disadvantages become aggravated.

The present reactor structure overcomes the aforementioned limitations by providing instead of a relatively thick, solid or sandwich type core plate, or instead of a pair of closely spaced core plates and connecting "stay" or flow tubes, single relatively thin upper and lower core plates having displaced grid or plate type supporting members attached thereto and employing the adjacent normally present control rod containing tubes for support. Thus, thermal stresses are kept to a minimum in the relatively thin core plates and are not generally introduced into the guide tube support plate and lower support grid member which are the primary supporting members for the novel core arangement. This novel reactor structure eliminates the prior art problems by directing the core plate load through relatively thin core plates to the present control rod containing tubes and their attached supporting members. The support members in turn are supported by the vessel walls either directly or indirectly.

Generally in the reactors of the prior art a second or inner barrel often called an upper core support barrel has been necessary for transmitting to the vessel wall the dynamic load engendered due to the scramming or falling of control rods. This load first went through a heavy core plate to the upper core support barrel. However, it has been found by making the guide tube support plate of a substantially rigid structure and securing the guide tubes to the guide tube plate that the tubes themselves and guide tube support plate can instead bear the aforementioned dynamic load and thus eliminate the necessity for using two instead of just one barrel above the core and an extra heavy upper core plate. To accomplish this there is employed a hold-down plate secured to the guide tube plate, the hold-down plate in turn being engaged by a hold-down ring. The present invention, however, also contemplates wing portions secured to the sides of the guide tubes whereby the wing portions can be either welded, bolted, or in some other fashion secured to the guide tube support plate directly so as to eliminate the necessity for the extra hold-down plate if that is so desired. However, when such a hold-down plate is so eliminated and it is still desired to be able to remove individual control rod drive shafts, some other means must be provided to accomplish such a purpose if the upper section of the guide tubes are to remain fixed in place. Thus, there is contemplated the use of a removable cover member on the top of the guide tubes to permit such ready removal of individual drive shafts. The present invention further contemplates a securing of the guide tubes to the upper core plate which is necessary for the guide tubes to be a substitute for the upper core support barrel.

Further advantages accrue to this novel reactor structure as a result of simplified refueling. Prior art arrangements required that the control rod drive shafts, the guide tubes, and the guide tube support plate all be removed individually. Then the inner barrel and upper core support plate were taken out together. While the present structure still permits individual drive shafts to be withdrawn when necessary, it also allows for removal of the entire upper core plate supporting structure and associated components as a single sub-assembly with the control rod drive shafts in place. This advantage becomes more significant in larger reactors as the number of control rods are increased, and as the period between fuel handling operations shortens due to cyclic loading schedules.

Accordingly, it is an object of this invention to provide a supporting structure for a reactor core which satisfies the strength requirements for such structure but which substantially avoids the necessity of the major portion of such structure from being in close proximity to the highly active core elements.

An object of this invention is to provide a supporting structure for the internals of a reactor wherein the thermal stresses in such structure are substantially reduced.

A still further object of this invention is to provide a supporting structure for the internals of a reactor such that the manufacture, assembly and disassembly, fuel loading, cycling and the like are greatly facilitated.

Another object of the present invention is to provide a core supporting structure having relatively inexpensive thin supporting plates adjacent the core with those plates including a substantial number of flow holes so as to minimize fluid pressure losses within the reactor.

Still another object of the present invention is to provide a supporting structure for a reactor core which is adequately cooled so that excessive stresses are not set up to limit the versatility of the operation of the reactor.

A further object of the present invention is to incorporate otherwise non-supporting elements of a reactor, such as shroud tubes, with a displaced lower supporting grid member provided by the invention, to reinforce a relatively thin lower core supporting plate.

A still further object of the present invention is to incorporate the lower shroud tubes of a reactor between a relatively thin core supporting plate and a grid member so that they provide a column type reinforcing support for the core plate and the fuel elements supported thereby.

Another object of this invention is to provide tie rods connecting a lower support grid and a lower core supporting plate so that shroud tubes can be rigidly connected therebetween and whereby the tie rods are in tension and the shroud tubes are in compression to provide added support for the lower core supporting plate thereby employing previously unused portions of the reactor assembly to permit the implementing of a relatively thin and substantially perforated lower core supporting plate.

A still further object of the present invention is to provide a primary core supporting structure adjacent the bottom of the reactor displaced from the core proper so as to permit more flow holes in the core plate as well as simplyfying the core plate construction so as to reduce the required time to fabricate the same and thus reduce the scrap rate and cost thereof.

A still further object of the present invention is to provide a novel bottom supporting member employing a series of beams in a generally 90° grid pattern or a casting which supports the lower ends of the shroud tubes to provide side rigidity in addition to vertical rigidity.

Another object of the present invention is to provide a novel bottom supporting structure providing ready flow paths for optimum hydraulic operation of the reactor while also providing a readily releasable means for securing the lower ends of the shroud tubes to the supporting structure to permit spring loading of the control rods therein.

Another object of the present invention is to provide for removing of individual control rod drive shafts where guide tubes are fixed to the guide tube support plate.

In accord with the above object, it is an object of the present invention to provide a novel releasable cover member for the top of guide tubes to permit ready removability of control rod drive shafts.

A further object of the present invention is to provide a novel means for securing control rod containing tubes to core support plates and to other supporting components of a reactor.

These and other objects, features and advantages of the invention will become more apparent upon consideration of the following detailed description of a novel core supporting structure incorporating various components constructed in accordance with the principles of the invention, when taken in connection with the following drawings, in which.

It can thus be seen that the present description relates to novel supporting structure for the core and associated elements of a neutronic reactor. This structure employs already existing and necessary components of the reactor for providing the proper support for the upper and lower core supporting plates, which in turn support the core structure, including the fuel elements, of the reactor. More specifically, this novel structure fixes the guide tubes to a guide tube support plate and an upper core plate wherein the guide tube support plate is supported by the vessel and the guide tubes support the upper core plate through suspension. Thus, all of the support functions of an inner upper core plate support barrel used in prior reactors have been transferred to the control rod guide tubes, and the aforesaid inner support barrel has been eliminated. At the same time, the fabrication of the upper core plate has been simplified by transferring control rod scram loads through the guide tubes directly to the guide tube support plate rather than having this load absorbed by the upper core plate. As such, the upper core plate does not bend under these load stresses to damage the adjacent fuel elements when scramming takes place. Heavy scram loads are readily taken by the guide tube support plate since it is located some distance away from the core and is not subjected to high intensity gamma heating stresses. The upper core plate can thus be made as a single ply machined locating plate rather than as a built up weldment. The guide tube plate also presents a more advantageous shape for carrying bending loads since it is only apertured for control rod clearance. The upper core plate, on the other hand, must provide openings for engaging the fuel assemblies as well as for control rods and flow passages. The single ply core plate permits machining of guide surfaces directly in the plate, thus eliminating the need for more commonly used separate guide blocks. Further, the additional use of a removable cover used on the end of the guide tubes permits individual removal of control rod drive shafts where the guide tubes are not readily detachable from the guide tube support plate. These features thus eliminate the need for the more common inner core plate support barrel, and if desired, even eliminate the need of a hold-down plate if the guide tubes are welded or bolted directly to the guide tube support plate when it is advantageous to so connect them.

With respect to the lower core supporting plate, this novel reactor structure fixes the lower shroud tubes to both the lower core plate and a grid support member wherein the shroud tubes provide support for the lower core plate and in combination with the grid support member and a core supporting barrel provide the primary support for the reactor core. This allows for the lower core plate, now no longer a primary supporting member, to be relatively thin and substantially perforated and further allows the primary support to be a substantial distance from the core proper. Since the lower grid support member experiences only moderate gamma heating and need not be cut-out for large flow holes as is the lower core plate, it is possible to make the structure as stiff as desired without undue complexity in fabrication. Furthermore, this invention permits guide surfaces to be incorporated directly in the core plate cut-outs so that no guide blocks are needed. In the remote locating of the grid support member, tie rods between the core barrel and the grid support member can be employed to provide the support for the grid support member that would otherwise have to be given by certain ones of the shroud tubes interconnected between the grid member and the lower core plate. In this instance the tie rods would absorb most of the tensional forces and the shroud tubes would bear all of the compressive forces created by the gravitational force of the core proper. Thus the lower core plate is supported against bending forces over its entire area. However, it has been found through experimentation that the outer group of shroud tubes go generally into tension and share the tensional load with the tie rods. Because of this it is to be understood that the outer group of shroud tubes can also be used alone instead of the tie rods for tensional support, but only at the expense of increased core plate stresses. Thus, it would only be desirable to eliminate the tie rods where the lowest possible core plate stresses are not necessary. Also, by using tie rods a thinner and cheaper lower core plate can be used because the tie rods are connected directly to the core barrel allowing little deflection of the grid member while the shroud tubes are only connected to the lower core plate which deflects much easier. With no tie rods the deflection of the peripheral portion of the lower core plate is carried to the grid member which, in turn, necessitates a thicker peripheral portion in the lower core plate to resist such increased deflection therein. Furthermore, a dropped rod accident will not cause any more than local damage to a single shroud tube because the heavy grid support member distributes the impact load among the tie rods. The resilient supports in the grid member also aid in absorbing impact loads from dropped rods. The supporting structure for the reactor embodied herein is not only substantially less expensive and more practical, but is also substantially more efficient than that of the prior art.

Figure 1:
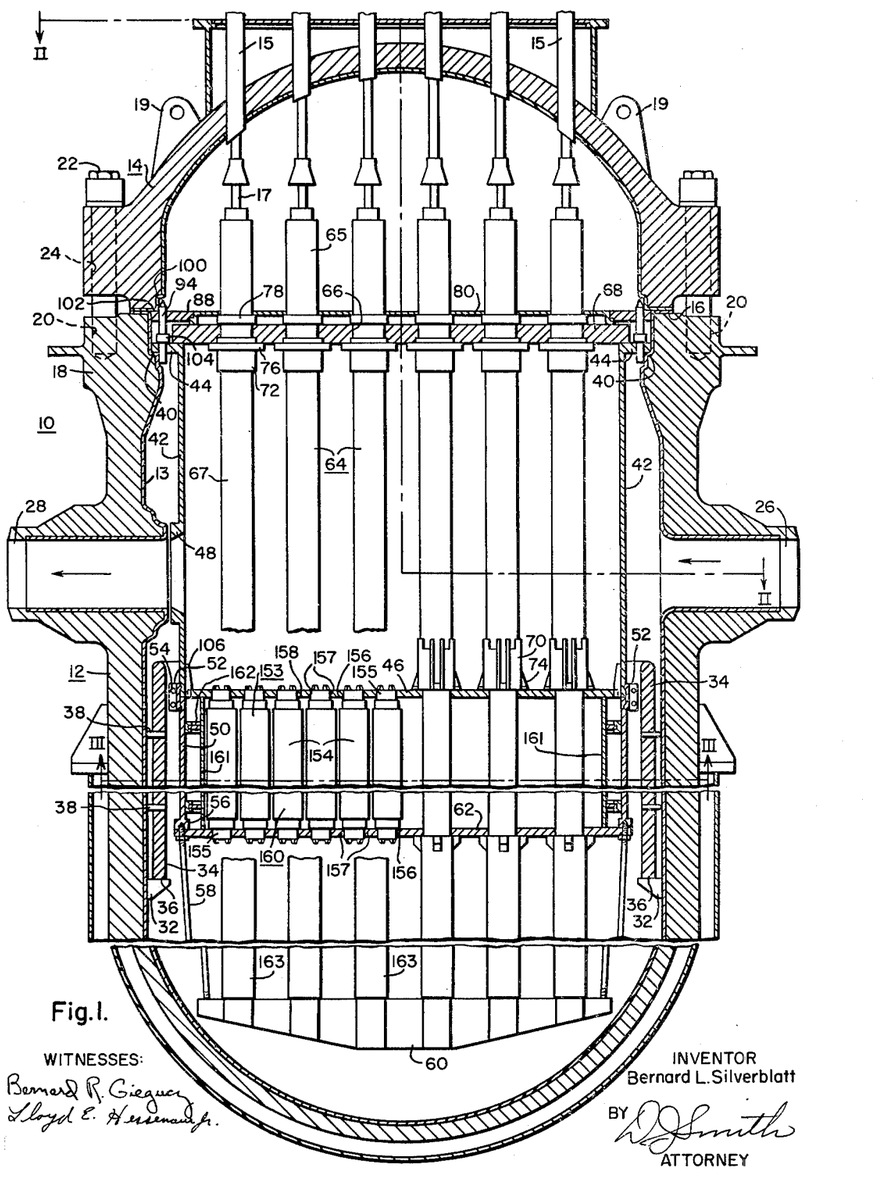
FIGURE 1 is a longitudinally-sectioned view of a neutronic reactor constructed in accordance with the principles of the present invention and taken generally along the reference line I—I of FIG. 2.
Figure 2:
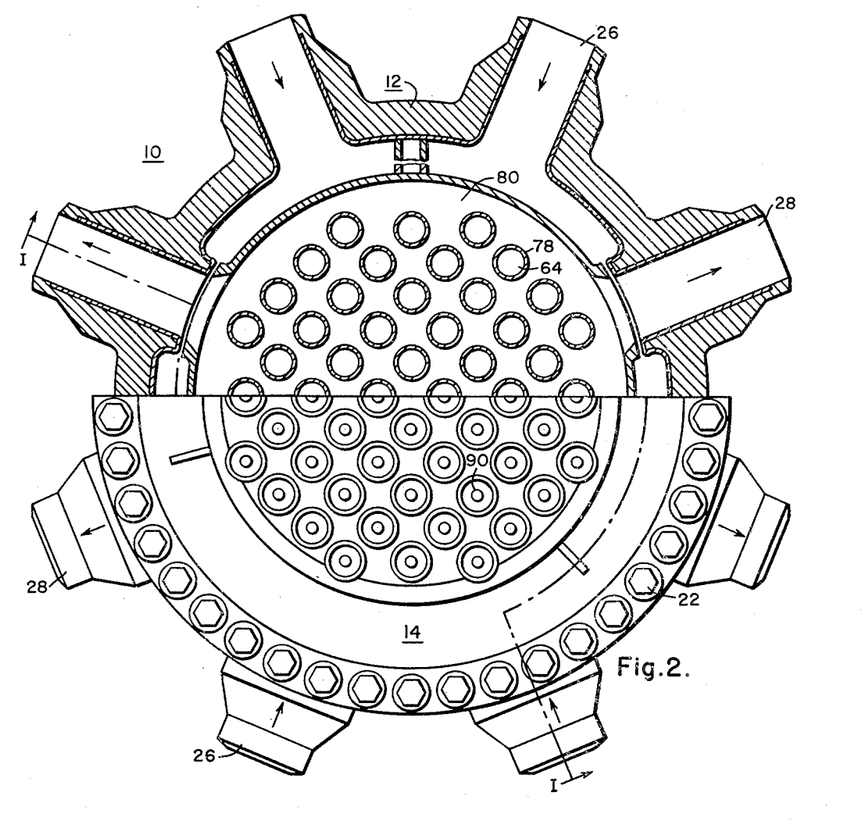
FIG. 2 is a top plan view, partially cross-sectioned, of the reactor of FIG. 1 taken substantially along the reference line II—II thereof.

With more particular reference to the drawings, in FIG. 1 there is illustrated a neutronic reactor 10 including a pressure vessel 12 and a head or cover member 14. The vessel 12 is generally cylindrically shaped having a closed bottom and an open top 16 which is enclosed by the cover member 14. The vessel 12 can be formed from any suitabe material, such as steel, having a wall thickness sufficient to withstand internal pressures in the order of 2000 p.s.i. Desirably, a stainless steel lining 13 is provided for corrosion resistance purposes. Adjacent the open side 16 of the vessel 12 there is provided an outwardly extending flange 18 having a plurality of threaded openings 20 formed therein to receive bolts 22 which extend through registered apertures 24 in the cover member 14. The bolts 22 thus serve to secure the cover member 14 to the vessel 12. Also supported on the cover member are the control rod drive mechanisms (not shown). The control rod drive mechanisms fit into an adapter 15, and the associated control rod drive shafts 17 extend therebelow. The control rod drive mechanism, adapter, drive shaft, etc. can be of any of the conventional types known in the prior art. For a suitable control rod drive mechanism and associated equipment see Patent 2,780,740 entitled "Linear Motion Device," issued February 5, 1957, to W. G. Roman et al. The lugs 19 are for purposes of lifting the cover member 14 away from the top of the vessel 12 when this is desired.

The vessel 12 is provided with inlet and outlet nozzles 26 and 28, respectively, to which there is secured fluid conduit (not shown) for respectively conveying coolant into and out of the vessel 12. The interior side wall of the vessel 12 is provided with inwardly extending lugs 32 which can be secured to the pressure vessel 12 by any suitable means, as for example by welding. A tubular thermal barrier or shield 34 is sized so as to be closely received within the pressure vessel 12 but spaced from the interior side walls thereof to absorb radiation heating. The lower end 36 of the thermal shield 34 is supported by the upwardly facing surface of the lugs 32 and is maintained in spaced relation with the wall of the vessel 12 by means of radial spacers 38 secured to the thermal shield 34 by any suitable means, such as by bolts for example.

An outwardly facing shoulder 40 is disposed on the inner side wall of a vessel 12 adjacent the open side 16 thereof. This shoulder 40 receives the core supporting structure so that practically the entire load of the reactor core is supported thereby, through suspension. In furtherance of this purpose, an upper barrel 42 supports the core barrel 50, as described later, and is provided with an outwardly extending peripheral flange 44 which is received and supported by the shoulder 40 of the vessel. The barrel 42 extends downwardly from the flange 44 past the nozzles 26 and 28 and terminates below these tubulations adjacent an upper core plate 46. The outlet nozzles 28 are joined to the interior of the barrel 42 through conduit portions 48. That is, the conduit portions 48 generally abut against the vessel wall at the nozzles 28 on expanding with a temperature rise when the reactor is operating.

Figure 3:
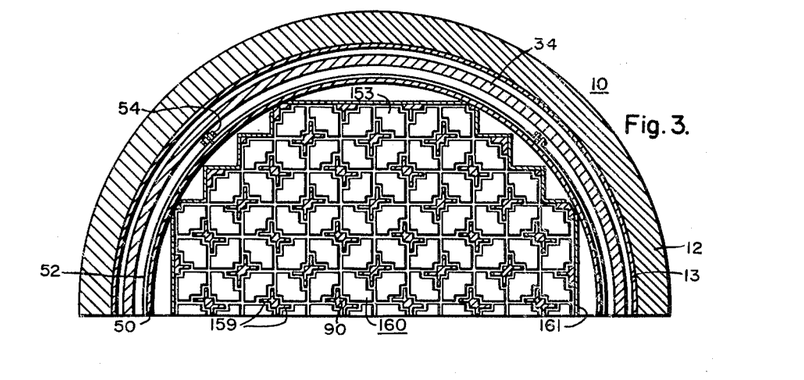
FIG. 3 is a partial, cross-sectional view of the core of the reactor of FIG. 1 taken substantially along the reference line III—III thereof.

As stated previously, the core barrel 50 is supported at its upper end by the lower end of the upper barrel 42. The upper end of the barrel 50 can be coupled to the barrel 42 by means of a clamp 52. The clamp 52, made in several sections as seen in FIG. 3, secures the lower lower end of the barrel 42 to the very upper edge of the barrel 50, the bottom opening of the barrel 42 being coextensive with the upper opening of the barrel 50. The sections of clamp 52 are then rigidly connected to each other by means of bolts 54 or the like. It is also understood that the barrels 42 and 50 can be secured together by different means, such as by directly bolting together for example, or can be formed together as a one-piece barrel. However, while it may be desirous to make them of a one-piece construction, for obvious reasons it generally is not practical because such a structure in the bigger reactor is too large to handle and machine. Suspended from a thickened portion 56 at the lower end of the barrel 50 are a tie rod 58 and a core support grid 60, which will be described in more detail later. Also engaged with the lower end of the barrel 50 is a lower core plate 62 which will likewise be described in more detail later.

Figure 4:
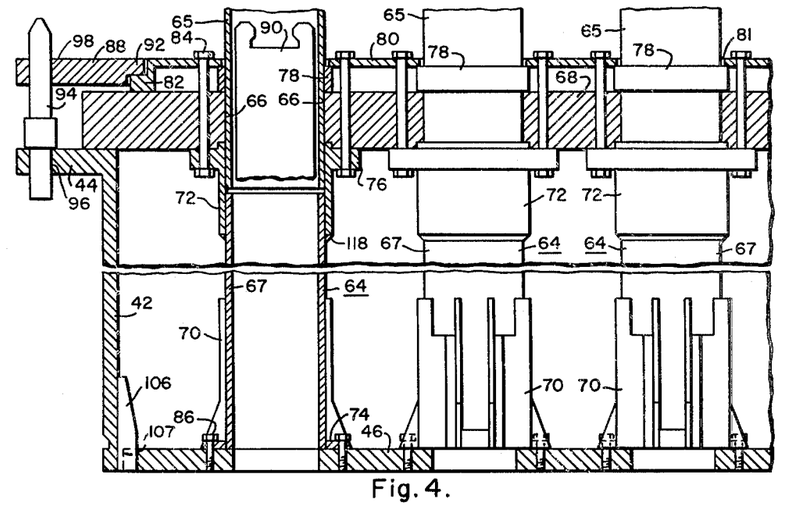
FIG. 4 is a partial, enlarged view of the upper left portion of the reactor of FIG. 1 including some of the guide tubes and supporting plate therefor and being partially sectioned.

In the embodiment shown in FIGS. 1 and 4 control rod guide tubes 64 are comprised of separable upper and lower sleeves 65 and 67, respectively. The lower sleeves 67 are engaged in a plurality of openings 66 in a guide tube support plate or casting 68. The peripheral extremes of the guide tube support plate 68 rest upon the upper flange 44 of the barrel 42. It is obvious that the guide tube casting of this invention also acts as a guide for the tubes 64 as well as acting as a support therefor. Because of the supporting function of the casting 68 it is preferred to fix the lower sleeve 67 to the guide tube casting 68 so that the upper core plate 46 can be supported in tension by the guide tubes 64. It is because of this that the guide tubes 64 are fixedly attached at their lower ends to the upper core plate 46. The guide tubes 64 thus transmit through the sleeves 67 the dynamic scram load of the control rods through the flange 44 to the vessel shoulder 40. The guide tubes not only support the upper plate 46 but also shield the control rods and drive shafts contained within the tubes from the water cross flow in the operating reactor.

One way of so supporting the core plate 46 from the guide tube casting 68 is illustrated in general in FIG. 1, and in more detail in FIG. 4. Connected to the lower end and intermediate portions of the shroud tubes 64, as by welding for example, are the collars 70 and 72 which contain flanges or wings 74 and 76, respectively, for abutting against the upper and lower surfaces of the upper core plate 46 and guide tube casting 68, respectively. Slipped over the top of guide tube 64 is a removable collar 78 which is adapted to abut against the top surface of the guide tube casting 68. A hold-down plate 80 having apertures 81 generally in registration with the openings 66 in the guide tube casting 68 is then slipped over the top of the sleeves 65 of the guide tubes 64 so that its lower shoulder portion 82 engages with the top surface of the guide tube casting 68. It is noted that the apertures 81 in the hold-down plate 80 are of such a size that the peripheries thereof engage over the top surfaces of the collars 78. Registered holes in the hold-down plate 80, guide tube casting 68, and flanges 76 of the collars 72 permit a nut and bolt assembly 84 to secure these elements together and in turn fix the guide tube casting to the guide tubes 64. Likewise, registered holes in the flanges 74 and the upper core plate 46 permit bolts 86 to secure these elements together.

The sleeves 65 are made separable from the sleeves 67 and are only slip fitted in place so each can be individually removed when it is desired to withdraw a drive shaft. However, if the upward hydraulic flows are so great that they would displace the sleeves 65 from apertures 66 then collars 78 can be spot-welded or otherwise secured thereto so that the hold-down plate not only secures the guide sleeves 67 to the guide tube support plate 68 but also secures the guide sleeves 65 thereto through collars 78. This latter modification means, however, that the entire hold-down plate must be removed before an individual drive shaft 17 can be removed unless the top of the sleeves 65 are removable. This possibility is discussed later with respect to FIG. 7.

Corresponding to the outer peripheral edge of the hold-down plate 80 and the vessel walls is a hold-down ring 88 which prevents the guide tube casting 68 from being upwardly movable, until desired. The hold-down ring 88 accomplishes this by having a shoulder portion 92 mate with the shoulder 82 of the hold-down plate. These shoulders should always be in proper alignment due to the action of pins 94 which are engaged in registered apertures 96 and 98 in the flange 44 of the barrel 42 and the hold-down ring 88, respectively. An overlapping portion 102 of the bottom wall of the reactor cover 14 prevents any upward movement of the hold-down ring 88 when the cover is in its closed operative position. Thus, the bracing of the reactor cover in its fixed operative position serves to secure the barrel flange 44, the hold-down ring 88 and, in turn, the guide tubes 64 and guide tube casting 68 in a fixed relationship to one another whereby the upper core plate 46 is primarily supported by the guide tube casting 68 by suspension through the columns or guide tubes 64. It will also be noted that wings 106 weldedly secured to the side walls of the barrel 42 serve as alignment keys for the core by biting into slots 107 formed in the outer peripheral edge of the upper core plate 46.

Figure 5:
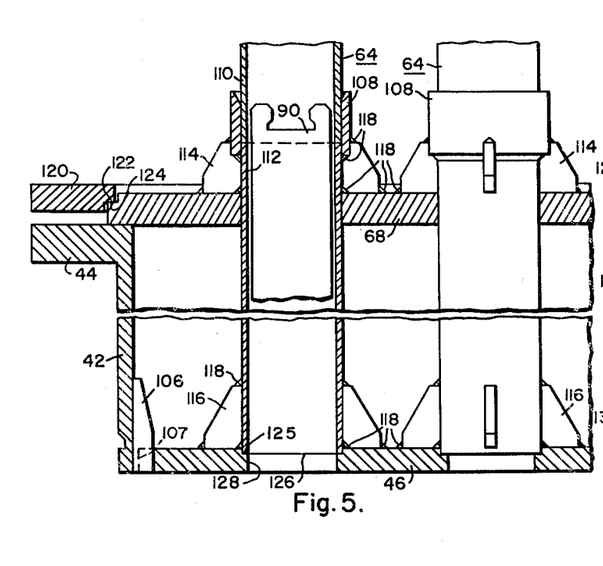
FIG. 5 is a view similar to FIG. 4 but showing a modification of the structure shown therein.
Figures 7, 12:
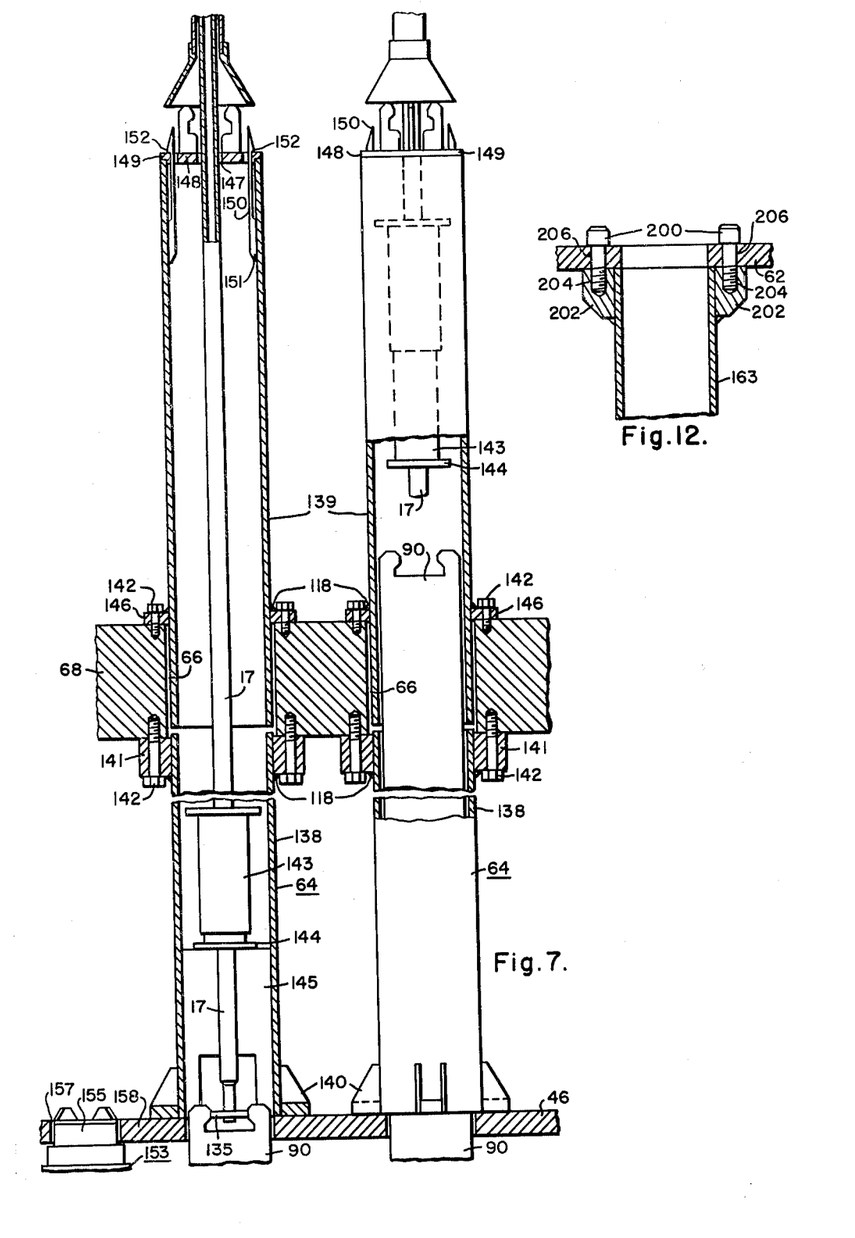
FIG. 7 is a partial cross-sectional view of a modified form of reactor.
FIG. 12 is a partial, enlarged view of a portion of the reactor as shown in FIG. 8 illustrating the inner connection between the shroud tube and the lower core plate of the reactor.

An alternate method of supporting the upper core plate 46 is illustrated in FIG. 5. In this modification each guide tube 64 comprises upper and lower abutting sleeves 110 and 112 respectively. The lower sleeve 112 has weldedly secured to it a collar 108 which also serves to join together with a slip fit the abutting sleeves 110 and 112 of the guide tubes 64. The sleeves 112 are then fixed to the upper core plate 46 and to the guide tube support plate 68 by means of wing portions 114 and 116 which are connected respectively to the adjacent guide tube and plate by means of welds 118 or the like. Because the guide tubes 64 are secured directly to the guide tube support plate 68 and the upper core plate 46 there is no need for a hold-down plate for clamping purposes. Because of this a hold-down ring 120 can be engaged directly with the guide tube support plate 68 by means of mating of shoulder portions 122 and 124 on the hold-down ring and guide tube support plate, respectively. It is of course understood that the guide tubes 64 can be of a one-piece or equivalent construction with the result that an upper section thereof cannot be readily removed. However, this would prevent the removal of a single drive shaft 17 (FIG. 1) without removing all of the guide tubes 64 unless some alternate means, such as illustrated in FIG. 7 and explained later, are used.

To make sure that the lower ends 126 of guide tubes 64 are located in exactly the proper relationship with respect to apertures 128 in the upper core plate 46, cut-out shoulders 125 are provided so that the lower ends 126 can seat on these shoulders and align the openings 128 with the inner tubular portion of the guide tubes 64. Because of this control rods 90 can move up and down freely through the guide tubes 64 and the core support plate 46 without interference from protruding edges. It can readily be seen that in this type of construction not only is the need for an upper core plate support barrel eliminated, but also eliminated is the need for accessory equipment such as a hold-down plate. Reference should be made to the subsequent description of the modification of FIG. 7 for a full understanding of the operability of a non hold-down plate modification. Of course, such elimination of parts renders a corresponding reduction in the cost of materials that would otherwise be necessary to provide an equivalent function.

Figure 6:
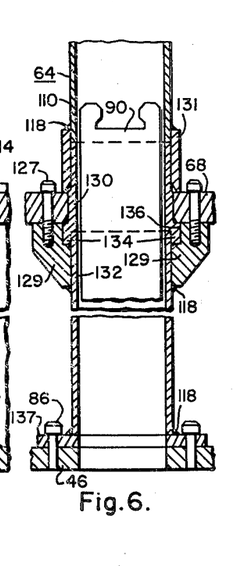
FIG. 6 is a partial, cross-sectional view of another modification of the structure shown in FIG. 4.

As illustrated in FIG. 6 another arrangement of a guide tube supporting assembly is to employ screw or bolt type assemblies 127 which are used to secure wings 129 to the guide tube casting 68. However, this arrangement is somewhat different than that of FIG. 5 not only due to the fact that the wings 129 are mounted below the guide tube support plate instead of above to provide room for an upper collar 131, but also because a different configuration of guide tube is employed. Here, instead of the section 112 of FIG. 5 there are substituted two sections 130 and 132. The upper collar 131 is secured to the section 110, by welds 118 for example, and slip fits over the top end of the section 130 so as to be readily removable when it is desired to remove a drive shaft 17 (FIG. 1). The reason for this double section is that it is easier to machine a short section like this to obtain a proper fit with the guide tube casting 68 than to machine the entire length of a section like section 112 of FIG. 5 from heavier walled tubing just to have a shouldered fit as described below.

The section 130 of the guide tube 64 contains an outwardly and downwardly extending shoulder 134 which serves to seat on the upper end of the section 132 and within notches 136 in the wings 129. By being engaged between the notches 136 and the upper end of the section 132, the section 130 is securely fixed to the guide tube casting 68, this shoulder arrangement providing a reinforcement for the bolted connection formed by the wings 129 and the bolts or screws 127. Instead of wing portions to connect the bottom portion of the guide tube to the upper core plate 46, a ring type flange 137 is welded, at 118, to the lower end of the guide tube and this, in turn, is engaged by the bolts 86 to secure the guide tube 64 to the upper core plate 46. Thus, it can readily be seen that the modification as illustrated in FIG. 6 also provides the advantages of eliminating the need for an upper inner core plate support barrel and a hold-down ring as does the modification of FIG. 5.

The components illustrated in FIG. 7 comprise a broken-out portion from a reactor similar to that illustrated in FIG. 1 only with a modified guide tube, guide tube support casting and upper core plate arrangement. Like reference numerals are employed to indicate like parts of the reactors. From this illustration the operability of a non hold-down plate type of assembly and the load bearing effects of the scramming of control rods on the guide tubes should be more fully understandable.

The guide tube 64 of FIG. 7 comprises two sections, namely a lower section 138 and an upper section 139. Wings 140 at the end of the lower section 138 are secured, by welding or bolting, to the upper core plate 46 so as to provide support therefor as in the other modifications. Fixedly secured to the upper end of the section 138 is a collar 141 through which bolts 142 can be used to secure the guide tube section 138 to the bottom of the guide tube casting 68. Thus, the guide tube lower section 138, through suspension from the guide tube casting 68, provides the support for upper plate 46.

However, the guide tube lower section 138 also performs another important function with respect to the plate 46. That is, it absorbs any of the dynamic loads which are impressed thereupon due to scramming of control rods 90 where these loads before were borne by the upper core plate which often resulted in a distorted surface, so as to cause the core plate to be projected into interference with the fuel assemblies 153 located therebelow. It can be seen from the left-hand guide tube of FIG. 7 that the control rod 90 is secured to the end of the drive shaft 17 through means of an interlocking plate 135, as a result, when the control rod 90 drops from the position shown in the right-hand guide tube of FIG. 7 to that shown in the left-hand guide tube of FIG. 7, it pulls the drive shaft 17 down with it. This dropping of control rods is commonly called scramming. It can also be seen that in an intermediate section of the drive shaft 17 is a hydraulic type shock absorber 143, shown in its compressed position in the left-hand guide tube and in its expanded position in the right-hand guide tube, so that when the lower plate 144 of the shock absorber strikes the stop 145 connected to the shroud tube 64 the shock absorber 143 is compressed. Any loads transmitted by the scramming are thus transferred directly to the lower section 138 of the guide tube 64, thence to the guide tube casting 68 and to the vessel wall. The stop 145 limits the amount of drop which the control rod 90 can take and cooperates with another shock absorber located near the other end (see FIGS. 10 and 13) of the dropped control rod 90 to absorb the full impact of such dynamic loading. As explained previously with respect to FIGS. 4 to 6, because the guide tube lower section 138 supports the upper core plate 46 and absorbs any dynamic loading thereon, the upper core plate support barrel usually provided in reactors of this type is eliminated and, in turn, bending stresses on the upper core plate are eliminated along with any corresponding damage to the fuel assemblage which may be caused by any bending stresses placed upon the upper core plate 46.

The modification of FIG. 7 primarily differs from the others previously described in that the upper section 139 is fixedly attached to the guide tube support casting 68 by a collar 146, which in turn is secured to the casting 68 through a threaded bolt 142. This of course means that the section 139 cannot be readily removed to permit a drive shaft 17 to be taken out individually unless the bolts 142 holding the collar 146 to the casting 68 are first removed. It has been found more advantageous to secure the upper section 139 rigidly to the guide tube casting 68 in that the upward flow of water or other fluid through the guide tube 64 is such that it might lift the upper section 139 out of the aperture 66 in the casting 68 if it is not securely fastened thereto. Since the individual bolts 142 are rather difficult to get at to loosen the sleeve when it is desirable to remove a single drive shaft 17, some other means of removing the drive shaft is necessary since the large diameter of the components of the shock absorber 143 cannot pass through an aperture 147 in a top cover 148 of the section 139. The cover 148 of this invention is made readily removable in that it rests on the upper end of the section 139 by means of an overlapping shoulder 149 and is held thereto by a catch type resilient arm member 150, which is secured at its lower end 151 to the inner surface of the guide tube section 139 and protrudes through an opening in the top cover 148 so that its hooked upper end 152 engages the top surface of the cover to keep it in its retained position. When it is desired to release the cover 148, the spring is pushed away from its catch engagement with the top cover because the opening through which the upper end 152 protrudes is somewhat larger than the stem of the catch member 150. A plurality of catch members 150 can be used, if desired, to secure a single cover 148 on a guide tube. Thus, when it is necessary to remove a single drive shaft 17, the catch members 150 are merely moved inwardly towards the center of the cover 148 thereby releasing that cover from engagement with the guide tube and the entire drive shaft and its component parts are lifted through the top opening in the guide tube upper section 139. It is of course understood that if desired the upper sections 110 of FIGS. 5 and 6 similarly could be rigidly connected to the guide tube casting 68 and a removable top cover such as the cover 148 be employed so as to eliminate the necessity of using a hold-down plate as illustrated in FIG. 4 to permit individual removal of the drive shafts 17 when desired.

The particular reactor core structure illustrated in FIG. 1 and partially described thus far does not necessarily form a part of the instant invention and for a more detailed description of the physical and nuclear parameters of a typical reactor core, reference can be had to the detailed description in the patent application of Robert J. Creagan, Serial No. 33,260 filed September 29, 1960, entitled "Neutronic Reactor" and assigned to the same assignee as is the present invention.

Generally, however, the reactor core illustrated in FIG. 1 comprises a plurality of encased fuel elements in each cluster 153. Each of the fuel elements are formed by any suitable means well known in the art, as for example by the use of elongated tubular cladding members formed from stainless steel and containing stacked uranium dioxide pellets. Some or all of the fuel elements can include uranium dioxide in its natural or source grade state, that is, with the ratio of uranium 235 to uranium 238 equal to 1 to 139. The remainder of the fuel elements can contain uranium dioxide in a slightly enriched state wherein the ratio of uranium 235 to uranium 238 is greater than 1 to 139. The details of the location of the slightly enriched elements relative to the natural uranium elements can be had from the aforementioned copending application. Alternatively, all of the fuel elements can be enriched to the same or differing degrees.

Each of the fuel elements desirably is hermetically sealed by sealing each of the stainless steel fuel containing tubes at the ends thereof, for example, by welded caps. The aforementioned conventional fuel elements and their component parts are not shown in the drawing since they are contained within each of the clusters 153. Each cluster 153 has an outer stainless steel tubular shell 154 for housing the fuel elements and is provided with a nozzle or other flow conducting supporting assembly 155 disposed at each end thereof. Each nozzle assembly 155 is provided with a shoulder 156 which is adapted to rest against the core plates 46 and 62 about the peripheral edges of mating apertures 157. Each nozzle assembly 155 can be cast as a single part or can be formed by welding a group of component parts together, as desired.

It will be appreciated that in this embodiment of the invention, the nozzle structure 155 for each of the clusters 153 is the same at the upper and lower ends thereof. However, this is not a necessary requirement. The upper and lower nozzle supporting structures 155 for each cluster 153 is supported and received by perforations 157 in the upper and lower core plates 46 and 62, respectively, as previously described. However, a space is generally left between the upper shoulders 156 and the upper core plate 46 during assembly to allow for expansion of the clusters 153 when the fuel elements are activated.

In viewing FIG. 3, control rod channels 159 are formed between certain of the clusters 153 to permit a control rods 90 to be inserted and withdrawn from reactor core 160. The particular structural arrangement which provides for the control rod channels 159 is specifically shown and described in the aforementioned copending application, Serial No. 33,260. In the present embodiment of the invention, the reactor core 160 is adapted to receive a plurality of control rods 90 which, in this example, are formed of a cruciform cross-section and which are adapted to be closely received in the control rod channels 159. Each control rod 90 is formed with a neutron absorbing material, as for example the aforesaid alloy, Ag-In-Cd. The control rods 90 are provided with extensions (not shown) which incorporate fuel elements to complete the pattern in the core where an absorber or control rod 90 is withdrawn.

Surrounding the core clusters 153 is a core baffle 161 having extremities extending between upper core plate 46 and lower core plate 62. Interlocking the baffle 161 to the core barrel 50 are mating prong type seats 162 which also serve to space the core baffle 161 from the core barrel wall 50. This in effect is a combining of the barrel and baffle into an integral structure which requires no machining of the baffle profile after final assembly. Differential pressure is taken by the round barrel 50 rather than by the form fitting baffle 161. By this structure the baffle thickness, and accordingly the overall diameter of the core assembly, is substantially reduced. Also, the fluid coolant is forced to pass through the core and not through the space between the core barrel 50 and the core baffle 161.

Figures 8, 9, 10, 11:
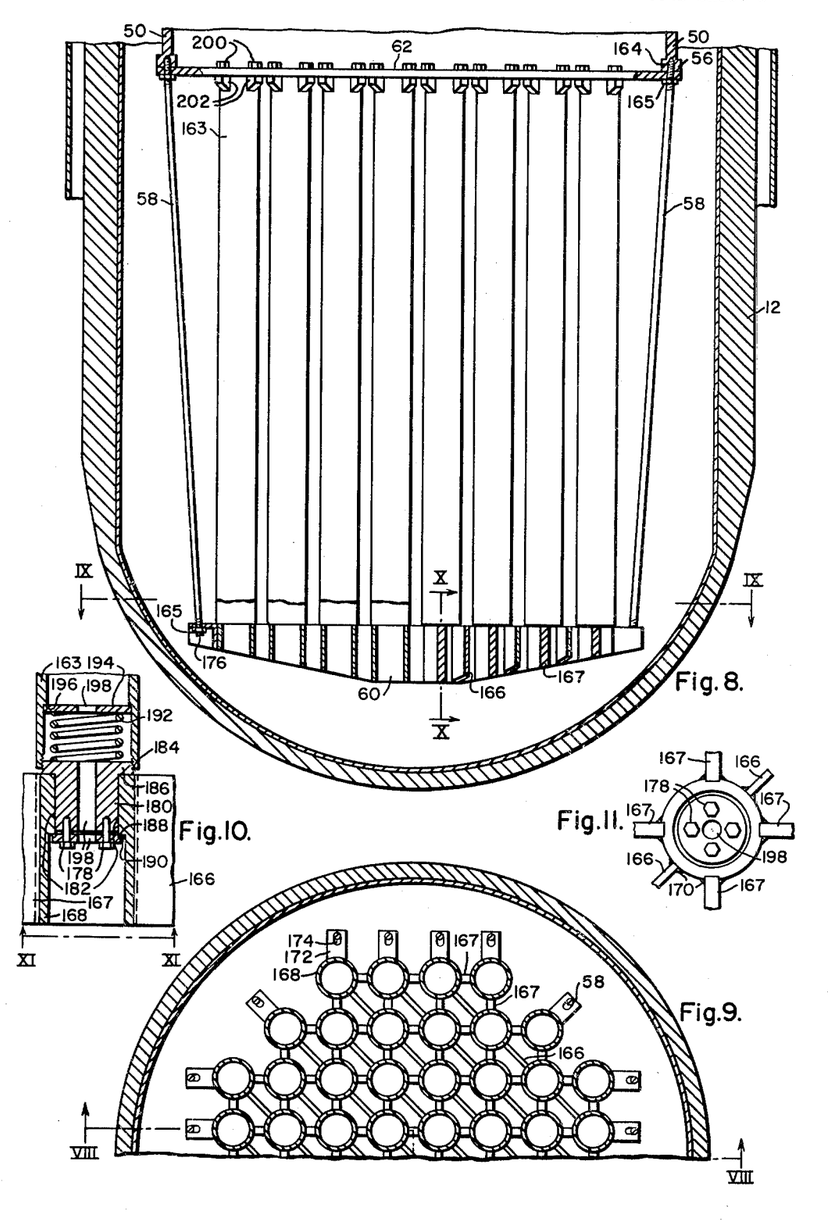
FIG. 8 is an enlarged view of the lower portion of the reactor of FIG. 1 and is taken substantially along the reference line VIII—VIII of FIG. 9.
FIG. 9 is a partial, cross-sectional view of the lower reactor portion of FIG. 8 and is taken substantially along the reference line IX—IX thereof.
FIG. 10 is a partial, enlarged, cross-sectional view of the lower portion of the reactor as shown in FIG. 8 and taken along the reference line X—X thereof.
FIG. 11 is a partial bottom plan view of the support grid member and shroud tube assembly shown in FIG. 10 and taken generally along the reference line XI—XI thereof.

The lower support structure is illustrated generally in FIG. 1 and more specifically in FIGS 8 to 13. Referring particularly to FIG. 8, the lower supporting arrangement incorporates structural elements having other purposes in the reactor, such as control rod shroud tubes 163, and uses up otherwise unused areas of the reactor such as that area in the bottom of the reactor below the lower core plate 62. It can be seen that the tie rods 58 are suspended from the thickened portion 56 of the core barrel 50 by way of a screw like engagement through threaded ends 164 of the tie rods. The upper nuts 165 serve to secure the threaded ends 164 in the thickened portion 56. Since the grid plate 60 is suspended from the lower ends of the tie rods 58 and since the shroud tubes 163 are supported at their lower ends on the grid plate 60, it can readily be seen that generally the shroud tubes 163 serve as column supports for the lower core plate 62 with the grid plate 60 serving as the primary structural support member therefor. However, as noted previously, the outer rows of shroud tubes 163 actually go into tension and can serve as the sole tensional support for the grid plate 60 if desired. It is mainly the inner shroud tubes 163 which go into compression to support the weight of the core. Thus, one of the features of this invention is that it places the primary structural member away from the high intensity gamma radiation and neutron bombardment from the core assembly so that it can be made substantially more rugged without sacrificing a corresponding pressure drop in the lower core plate 62. That is, it can be made heavier and bigger than could a core plate so that the holes in the casting or grid plate 60 can be made relatively large so as to minimize any fluid pressure drop when water passes through the grid plate 60 into the shroud tubes 163. Also, pressures are decreased in that water entering the core can do so not only through the bottom of the grid plate 60 but radially through the entire bottom assembly containing the shroud tubes 163. Also, because the primary structural member or grid plate 60 is at the lower bottom end of the vessel and away from the gamma radiations it can be fabricated, if it is to be a cast piece, with very little finish machining required so as to substantially reduce the cost thereof. It can thus readily be seen that this invention permits the use of a mass of structural materials spaced from the core 160 and that the shroud tubes 163 and grid plate 60 minimize bending stresses in the lower core plate 62.

Because the lower shroud tubes 163 are usually long and extend nearly down to the bottom of the vessel, this novel arrangement utilizes them for support by rigidly connecting them between the grid plate 60 and the lower core plate 62. Thus, as mentioned previously, it can be seen that the tie rods 58 are in tension while the majority of the shroud tubes 163 act as columns and are in compression. If desired, it is also possible to eliminate the tie rods 58 and combine the shroud tubes and the lower core plate 62 and grid plate 60 so that the outer shroud tubes serve as the tension members to support the grid plate 60 in suspension while the inner shroud tubes 163 serve as the compression elements. In this arrangement, the outer row of shroud tubes 163 carry the tensional load to the core barrel 50 instead of the tie rods. This may require some reinforcing of the outer few inches of the lower core plate however, and on the surface does not appear to be as an efficient modification as that utilizing the tie rods 58. On the other hand, recent experimental results indicate this can be done by allowing a higher stress in the core plate.

As mentioned above, the grid plate 60 can be of a casting which can require little extra machining. However, the actual modification shown in FIGS. 1 and 8 to 11 is a welded construction comprising generally vertical ribs interconnecting with one another and secured together by means of welding and the like. These ribs or beams 167 are in a 90° grid pattern and are interconnected by secondary rib or beams 166 extending diagonally through the 90° grid pattern. As will be most obvious from FIGS. 9 to 11, it can be seen that the beams 167 and 166 are not actually joined to one another but are joined to circular sleeves 168 which have the main purpose of supporting the lower end of the shroud tubes 163. Welds 170 join the beams 167 and 166 to the sleeves 168. Extending outwardly and welded to the outer row of sleeves 168 are angle irons 172 having apertures 174 therein to receive lower threaded ends 176 of the tie rods 58. The tie rods are secured to the angle irons by means of the lower nuts 165 so as to provide the necessary tensional support for the grid plate 60.

As seen in FIGS. 10 and 11, the shroud tubes 163 are connected to the grid sleeves 168 preferably by bolts 178 so that they can be readily releasable therefrom. This is accomplished primarily by a narrowed down protrusion portion 180 which is adapted to fit into a narrowed confinement 182 of the sleeves 168, with the protrusion 180 being threadedly engaged with end 184 of the shroud tubes 163 to provide for some adjustment if the lengths of the tubes 163 vary a little. However, it is understood that the protrusion portion 180 can be attached to the lower ends of the tubes 163 permanently by welding or the like if such adjustment is not necessary or if shimming is to be used instead. In this manner, a shoulder 186 of the protrusion 180 rests upon the top of the sleeve 168 and the lower portion thereof is engaged by the bolts 178, which pass through registered apertures in the bottom of the protrusion 180 and a securing plate 188. The securing plate 188 is larger in diameter than the narrowed confinement 182 so that it will engage a shoulder 190 of the sleeve 168 such that the end of the shroud tube is securely fastened to the grid plate 60. Resting on the top of the protrusion member 180 is a coil spring member 192, which is held in compression against the top thereof by means of a shroud tube end plate 194 which is engaged in an upwardly limited position by means of a shoulder 196 in the shroud tube 163. The purpose of this spring member is first to facilitate coupling of the drive shaft 17 (FIG. 1) to the control rod 90 by raising the uncoupled control rod into a retrieving position and, second, to absorb part of the impact which is placed upon the bottom plate 194 in the event a control rod is dropped thereagainst when inserted in the shroud tube 163. The movement of plate 194 acts as a hydraulic shock absorber to absorb some of the impact. It is noted that the plates 194, 188 and protrusion 180 contain apertures 198 which permit the flow of water through the shrouds and to prevent stagnant areas of water from forming below the plates 188 and the like.

As seen in FIG. 12, the upper end of the lower shroud tubes 163 are secured to the lower core plate 62 by means of bolts 200 engaging wing elements 202, which are preferably welded to the sides of the shroud tubes 163 adjacent their upper ends. These bolts 200 are engaged in threaded openings 204 in the wings which, in turn, are in registration with apertures 206 in the core plate 62.

Figure 13:
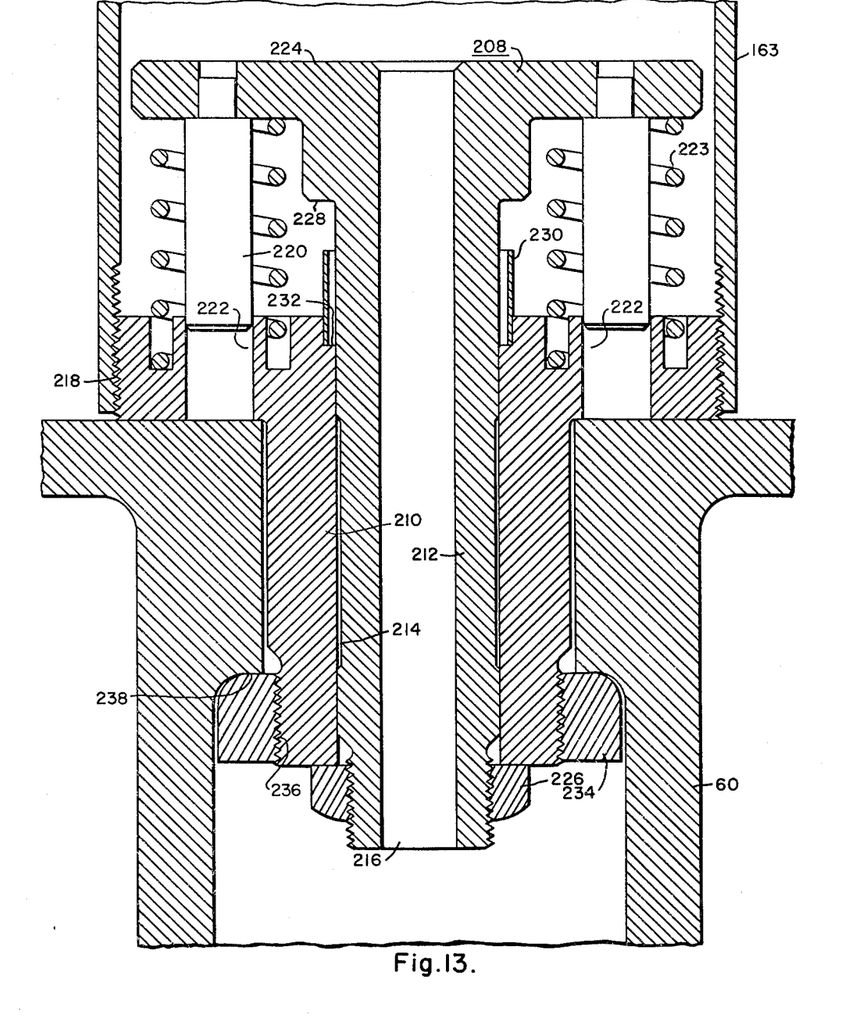
FIG. 13 is a partial cross-sectional view of a modified lower portion of a reactor similar to that shown in FIG. 10.

Illustrated in FIG. 13 is a modified shock absorbing form of an interconnecting assembly between the grid plate 60 and shroud tubes 163 comparable to FIG. 10. An interconnecting assembly 208 contains a pair of tubular members 210 and 212 with a flange at one end of each member. The stem of inner member 212 fits within an aperture 214 in the outer member 210. This relationship is such that stem of the member 212 is slidable within the stem of the member 210. The assembly 208 contains an opening 216 in the stem of its inner member 212 primarily for the same purposes as the opening 198 in the modification of FIG. 10, that is, to allow water to flow up through the shroud tubes 163. Each shroud tube 163 is threadedly engaged at 218 around the outer periphery of each member 210 so that slightly varying sized shroud tubes 163 can be accommodated by the interconnecting assemblies 208. Otherwise, if the shroud tube bottoms 163 were welded or otherwise permanently fixed to the top surface of the grid plate 60 and there was a variance in the length of adjacent shroud tubes, there would tend to be undue stresses placed on the surface of the grid plate 60 or on the shroud tubes 163 which might cause rupture of either or, at the minimum, make an uneven or unlevel surface for the fuel assembly supporting or lower core plate 62. The assembly 208 is fixed to the grid plate 60 by means of a nut 234 threadedly engaged wih the threads 236 at the lower end of the stem of the member 210. The nut 234 in turn engages with a shoulder 238 in the guide plate 60 to fix the assembly 208 to the plate.

Not only do the members 210 and 212 have mating stems but they are also interengaged through their flanges. This interengagement takes place by means of a plurality of protruding pins 220 fixedly secured to and extending from the flange of the member 212 so as to mate with apertures 222 formed in the flange of the member 210. Inserted over each pin 220 is a coiled spring 223, which is adapted to absorb impact when the element 208 is struck on its top surface 224 by a scrammed control rod 90. A nut 226 is threadedly engaged with the bottom end of the stem of the inner member 212 so as not only to secure the member 212 to the outer member 210, but to provide the proper amount of preloading to the springs 223. That is, by tightening or loosening the nut 226, the load on the springs 223 can be properly set.

Also found adjacent the flange end on the stem of the inner member 212 is a shoulder 228. The shoulder 228 cooperates with a crushing ring 230, which seats in a cutout 232 in the head of the member 210 such that if the dynamic loading of a scramming control rod 90 is so great that the coil springs 223 cannot absorb the full effect thereof the crush ring 230 will be engaged by the shoulder 228 and as the ring 230 crushes it also absorbs additional energy. Thus, it can readily be seen that the crush ring 230 serves as a safety feature if the dynamic load from a scrammed control rod is greater than normal, or if the loading on the spring 223 is improper. A further additional safety feature is that even if the crush ring 230 does not absorb all of the impact the bottom of the pins 220 eventually will bear against the top surface of the grid plate 60 to additionally act as a stop if all else fails.

It can be seen that the present invention involves a unique arrangement for supporting the upper and lower core plates of a neutronic reactor by means of incorporating the control rod containing tube elements as supporting members. Further included is the incorporation of guide tube support plate as a main structural core support member as well as the addition of new elements such as tie rods to give not only a more efficient but less costly arrangement for supporting the core elements.

Since it is obvious that the invention can be embodied in other forms and constructions within the spirit and scope thereof, as would be apparent to one skilled in the art, it is to be understood that the particular forms shown are but a few of many such embodiments. Accordingly, with various modifications and changes being possible, the invention is not limited in any way with respect thereto. Moreover, it is to be understood that certain features of the invention can be employed without a corresponding use of other features thereof.

Accordingly, what is claimed as new is:

1. In a neutronic reactor, the combination comprising a vessel, a core assembly including a plurality of fuel assemblies located within the confines of said vessel, a relatively flexible core plate forming part of the bottom of said core assembly for positioning said fuel assemblies within said core assembly, a relatively rigid primary support member spaced below said core plate and suspended from the walls of said vessel, and means extending between said core plate and said support member for supporting the main body of said core plate and said assemblies from said support member.

2. In a neutronic reactor, the combination comprising a vessel, a core assembly located within the confines of said vessel, a apertured relatively thin core plate forming part of the bottom of said core assembly for positioning and supporting elements of said core assembly, means for supporting the extremities of said core plate from the wall of said vessel, elongated shroud tubes located below said core plate and extending transversely thereof, a primary support member attached to the lower end of said shroud tubes, means for fixedly attaching the upper end of said shroud tubes to said core plate, and means placing some of said shroud tubes into tension and some of said shroud tubes in compression so as to provide support for the main body of said core plate.

3. In a neutronic reactor, the combination comprising a vessel, a core assembly located within the confines of said vessel, an apertured relatively thin and flexible core support plate forming part of the bottom of said core assembly for positioning and supporting elements of said core assembly, means for supporting the extremities of said core plate from the wall of said vessel, a relatively rigid primary support member spaced below said core plate, tie rods connecting said supporting means to the extremities of said support member, and shroud tubes extending between said core plate and said support member and being attached thereto, said tie rods supporting said support member through suspension and at least some of said shroud tubes supporting the main body of said core plate through compression.

4. In a neutronic reactor, the combination comprising a vessel, a core assembly located within the confines of said vessel, an apertured relatively thin and flexible core plate forming part of the bottom of said core assembly for positioning and supporting elements of said core assembly, a relatively rigid primary support member spaced below said core plate, means laterally discontinuous for supporting the extremities of said support member from the wall of said vessel, and elongated shroud tubes extending between and attached to said core plate and said support member, said shroud tubes providing columnar support for the main body of said core plate and being supported by said support member.

5. In a neutronic reactor, the combination comprising a vessel, a core assembly including a plurality of fuel assemblies located within the confines of said vessel, a core plate having insufficient mechanical strength to support said fuel assemblies resting thereon and forming part of said core assembly, a support member spaced below said core plate and being supported from the wall of said vessel, elongated shroud tubes located between said core plate and said support member and extending transversely thereof, said shroud tubes being engaged at their opposite ends with said core plate and said support member respectively, and resilient means adjacent the lower end of each of said shroud tubes for absorbing impact when control rods are dropped into said shroud tubes, said shroud tubes and support member providing the primary support for the core plate and said fuel assemblies.

6. In a neutronic reactor, the combination comprising a vessel, a core assembly being located within the confines of said vessel, a relatively flexible core plate forming part of said core assembly for positioning and supporting elements of said core assembly, a relatively rigid support member spaced below said core plate and being supported from the wall of said vessel, elongated shroud tubes located between said core plate and said support member and extending transversely thereof, said shroud tubes being engaged at their opposite ends with said core plate and said support member respectively, control rods extending through said core assembly and into said shroud tubes, drive shafts releasably connected to the upper end of said control rods, and resilient means in the lower end of each of said shroud tubes for absorbing impact when control rods are dropped into said shroud tubes and for biasing said control rods for coupling and uncoupling with said drive shafts, said shroud tubes and support member providing the primary support for the core plate, and said support member providing the support for said resilient means.

7. In a neutronic reactor, the combination comprising a vessel, an upper barrel supported from the upper periphery of said vessel, a lower core barrel supported from the lower end of said upper barrel, a core support plate secured adjacent the bottom of said core barrel, fuel assemblies located within the confines of said core barrel and resting on said core plate, a grid support plate spaced below the bottom of said core barrel, tie rods interconnecting the lower extremities of said core barrel and outer extremities of said grid support plate, and elongated columnar members extending between and attached to said core plate and said grid plate to provide the primary support for said core plate and said fuel assemblies.

8. In a neutronic reactor having an upright wall structure, a core assembly, a core plate forming part of said core assembly for positioning elements of said core assembly, elongated guide tubes located in said reactor and attached at their lower end to said core plate, a drive shaft through each of said guide tubes, a releasable perforated cover on the upper end of each of said tubes to permit individual removal of the contents thereof when desired and to regulate the flow of coolant therethrough, and said drive shafts being extended through said covers respectively so as to provide guide means for said drive shafts.

9. In a neutronic reactor having an upright wall structure, a core assembly, a core plate forming part of said core assembly for positioning elements of said core assembly, elongated guide tubes located in said reactor and attached at their lower end to said core plate, a cover generally enclosing the upper end of each of said tubes and having an elongated aperture adjacent one edge thereof, a resilient arm secured to the inners of each tube and extending out through said aperture, a hook element formed at the upper end of said arm and engaging the top of said cover, both said arm and said hook being smaller in their side extent than said elongated aperture so as to be able to pass therethrough, said arm being substantially smaller in its side extent than said hook so as to be movable sidewardly in said aperture to release said hook from engagement with said cover when it is desired to remove the contents of an individual tube.

10. In a neutronic reactor, the combination comprising a vessel, a core assembly located within the confines of said vessel, core support plates forming the upper and lower extents of said core assembly for positioning and supporting elements of said core assembly, a support member located below said lower core plate and being supported from the wall of said vessel, elongated shroud tubes within said vessel and attached at their opposite ends to said lower core plate and said support member respectively, elongated guide tubes extending lengthwise of said vessel and attached at their lower ends to said upper core plate, covers located on the upper end of said guide tubes, means attached to said guide tubes for releasably securing said covers to said guide tubes, control rods located in said shroud tubes and guide tubes and extending through said core assembly, and drive means attached to the upper ends of said control rods, said covers being releasable from said guide tubes when it is desired to completely remove at least some of the contents thereof.

References Cited by the Examiner

UNITED STATES PATENTS

| | | | |
|---|---|---|---|
| 2,898,280 | 4/59 | Schultz | 176—78 |
| 2,946,732 | 7/60 | Wooton | 176—31 |
| 2,948,517 | 8/60 | Cosner | 176—78 X |
| 2,977,297 | 3/61 | Evans et al. | 176—81 |
| 2,982,713 | 5/61 | Sankovich et al. | 176—61 |
| 2,986,509 | 5/61 | Duffy | 176—64 |
| 3,060,111 | 10/62 | Sherman et al. | 176—61 |

OTHER REFERENCES

IDO–24020 Engineering Test Reactor, USAEC report dated 1956, pp. 97, 125a, 126.

NAA-SR-Memo-685, U.S. Atomic Energy Document dated April 29, 1953, pp. 3, 4, 5, 7 and 11.

CARL D. QUARFORTH, *Primary Examiner.*

REUBEN EPSTEIN. *Examiner.*